(12) United States Patent
Wang

(10) Patent No.: US 10,685,192 B2
(45) Date of Patent: Jun. 16, 2020

(54) CARD READING TRANSACTION SYSTEM WITH AN INTERMEDIATE SERVER

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 0 days.

(21) Appl. No.: 16/244,053

(22) Filed: Jan. 9, 2019

(65) Prior Publication Data

US 2019/0228190 A1 Jul. 25, 2019

Related U.S. Application Data

(60) Provisional application No. 62/619,128, filed on Jan. 19, 2018.

(30) Foreign Application Priority Data

Nov. 15, 2018 (TW) .............................. 107140498 A

(51) Int. Cl.
*G06K 7/06* (2006.01)
*G06K 7/00* (2006.01)
(Continued)

(52) U.S. Cl.
CPC ....... *G06K 7/0013* (2013.01); *G06Q 20/3226* (2013.01); *G06Q 20/353* (2013.01); *G06Q 20/3674* (2013.01); *G07F 7/0893* (2013.01)

(58) Field of Classification Search
CPC ............. G06K 7/0013; G06Q 20/3226; G06Q 20/353; G06Q 20/3674; G07F 7/0893
See application file for complete search history.

(56) References Cited

U.S. PATENT DOCUMENTS 8,188,707 B2 * 5/2012 McBurney ............ H02J 7/0042
320/107
8,840,016 B1 * 9/2014 Schott .................. G07F 19/207
235/379
(Continued)

FOREIGN PATENT DOCUMENTS

JP 2002-7918 A 1/2002
JP 2006-23843 A 1/2006
(Continued)

OTHER PUBLICATIONS

Mitsuo Komiyama, Mobile Transaction and Token Technology, PROVISION, Feb. 23, 2017, pp. 44-49, No. 91, IBM, Japan.

*Primary Examiner* — Thien M Le
(74) *Attorney, Agent, or Firm* — Winston Hsu

(57) ABSTRACT

A card reading transaction system includes a transaction control device, an intermediate server, a smart card server, an internet dongle, and a card reader. The transaction control device transmits a transaction message according to a transaction type and a transaction amount. The intermediate server generates a transaction request message according to the transaction message. The smart card server generates a transaction confirmation message according to the transaction request message. The intermediate server generates a first card reader operation message according to the transaction confirmation message, and converts a transmission format of the first card reader operation message to generate a second card reader operation message. The internet dongle converts a transmission format of the second card reader operation message received through the internet to generate a third card reader operation message for the card reader to debit or credit the transaction amount.

12 Claims, 2 Drawing Sheets

(51) Int. Cl.
*G06Q 20/36* (2012.01)
*G06Q 20/34* (2012.01)
*G06Q 20/32* (2012.01)
*G07F 7/08* (2006.01)

(56) References Cited

U.S. PATENT DOCUMENTS

| | | | |
|---|---|---|---|
| 9,047,728 B1* | 6/2015 | Irudayam | G06Q 20/3221 |
| 2004/0010695 A1* | 1/2004 | Sahota | G06F 21/32 |
| | | | 713/185 |
| 2008/0272188 A1* | 11/2008 | Keithley | G06Q 20/12 |
| | | | 235/379 |
| 2009/0077646 A1* | 3/2009 | Sahota | G06F 21/32 |
| | | | 726/9 |
| 2011/0010291 A1* | 1/2011 | Adams | G06Q 20/0453 |
| | | | 705/39 |
| 2012/0150750 A1 | 6/2012 | Law | |
| 2014/0201084 A1* | 7/2014 | Dagenais | G06Q 20/40 |
| | | | 705/64 |
| 2014/0207682 A1 | 7/2014 | Wolfond | |
| 2015/0134538 A1 | 5/2015 | Kim | |
| 2015/0248664 A1 | 9/2015 | Makhdumi | |
| 2016/0292684 A1 | 10/2016 | Youn | |
| 2018/0006821 A1 | 1/2018 | Kinagi | |

FOREIGN PATENT DOCUMENTS

| | | |
|---|---|---|
| JP | 2008-197817 A | 8/2008 |
| JP | 2009-237969 A | 10/2009 |
| JP | 2011-210171 A | 10/2011 |
| JP | 2015-22653 A | 2/2015 |
| JP | 2015-526774 A | 9/2015 |
| JP | 2016-173752 A | 9/2016 |
| KR | 10-1706894 B1 | 2/2017 |
| TW | I462041 B | 11/2014 |
| TW | 201447635 A | 12/2014 |
| TW | 201545086 A | 12/2015 |
| TW | M514064 U | 12/2015 |
| TW | M532613 U | 11/2016 |
| WO | 2016/141356 A1 | 9/2016 |
| WO | 2018/006060 A1 | 1/2018 |

* cited by examiner

CARD READING TRANSACTION SYSTEM WITH AN INTERMEDIATE SERVER

CROSS REFERENCE TO RELATED APPLICATIONS

This non-provisional application claims priority of US provisional application U.S. 62/619,128, filed on Jan. 19, 2018, included herein by reference in its entirety.

BACKGROUND OF THE INVENTION

1. Field of the Invention

The present invention is related to a card reading transaction system, and more particularly, to a card reading transaction system with an intermediate server for simplifying hardware required by the client terminal.

2. Description of the Prior Art

The paperless trading model provides consumers with convenient choices; however, to provide all kinds of paperless transactions, such as credit cards, smart cards and mobile payments, the merchants will need to connect to the financial services providers through different types of specific electronic devices. Since the specific electronic devices will cause additional costs and require applications to the financial services providers, it is inconvenient for the merchants.

For example, in the prior art, to provide the transaction service of a smart card, in addition to installing a card reader, the merchant also needs to apply for an authorized transaction device from the financial service provider to connection with the transaction server of the financial service provider. The transaction device can make a transaction request with the remote transaction server, and control the card reader to debit or credit an amount to the smart card after the transaction request is confirmed. That is, the merchant has to have the specific transaction device provided by the financial service provider to connect to the transaction server and complete the transaction, which is very inflexible.

SUMMARY OF THE INVENTION

One embodiment of the present invention discloses a card reading transaction system. The card reading transaction system includes a transaction control device, an intermediate server, a smear card server, an internet dongle, and a card reader.

The transaction control device transmits a first transaction message according to a transaction type and a transaction amount. The intermediate server includes a smart card transaction application interface and an intermediate application interface. The smart card transaction application interface generates a transaction request message according to the first transaction message.

The smart card server generates a transaction confirmation message to the intermediate server according to the transaction request message after the transaction request is verified. The smart card transaction application interface generates a first card reader operation message according to the transaction confirmation message after the transaction confirmation message is received, and the intermediate application interface converts a transmission format of the first card reader operation message to generate a second card reader operation message, and transmits the second card reader operation message through an internet.

The internet dongle receives the second card reader operation message through the internet and converts a transmission format of the second card reader operation message to generate a third card reader operation message. The card reader performs a debit transaction or a credit transaction with a smart card within an effective scope of the card reader according to the third card reader operation message.

Another embodiment of the present invention discloses a method for operating a card reading transaction system. The card reading transaction system includes a transaction control device, an intermediate server, a smart card server, an internet dongle, and a card reader. The intermediate server includes an intermediate application interface and a smart card transaction application interface.

The method includes the transaction control device transmitting a first transaction message according to a transaction type and a transaction amount, the smart card transaction application interface generating a transaction request message according to the first transaction message, the smart card server generating a transaction confirmation message to the intermediate server according to the transaction request message after the transaction request is verified, the smart card transaction application interface generating a first card reader operation message according to the transaction confirmation message after the transaction confirmation message is received, the intermediate application interface converting a transmission format of the first card reader operation message to generate a second card reader operation message, the intermediate application interface transmitting the second card reader operation message through an internet, the internet dongle converting a transmission format of the second card reader operation message to generate a third card reader operation message after receiving the second card reader operation message through the internet, and the card reader performing a debit transaction or a credit transaction with a smart card within an effective scope of the card reader according to the third card reader operation message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
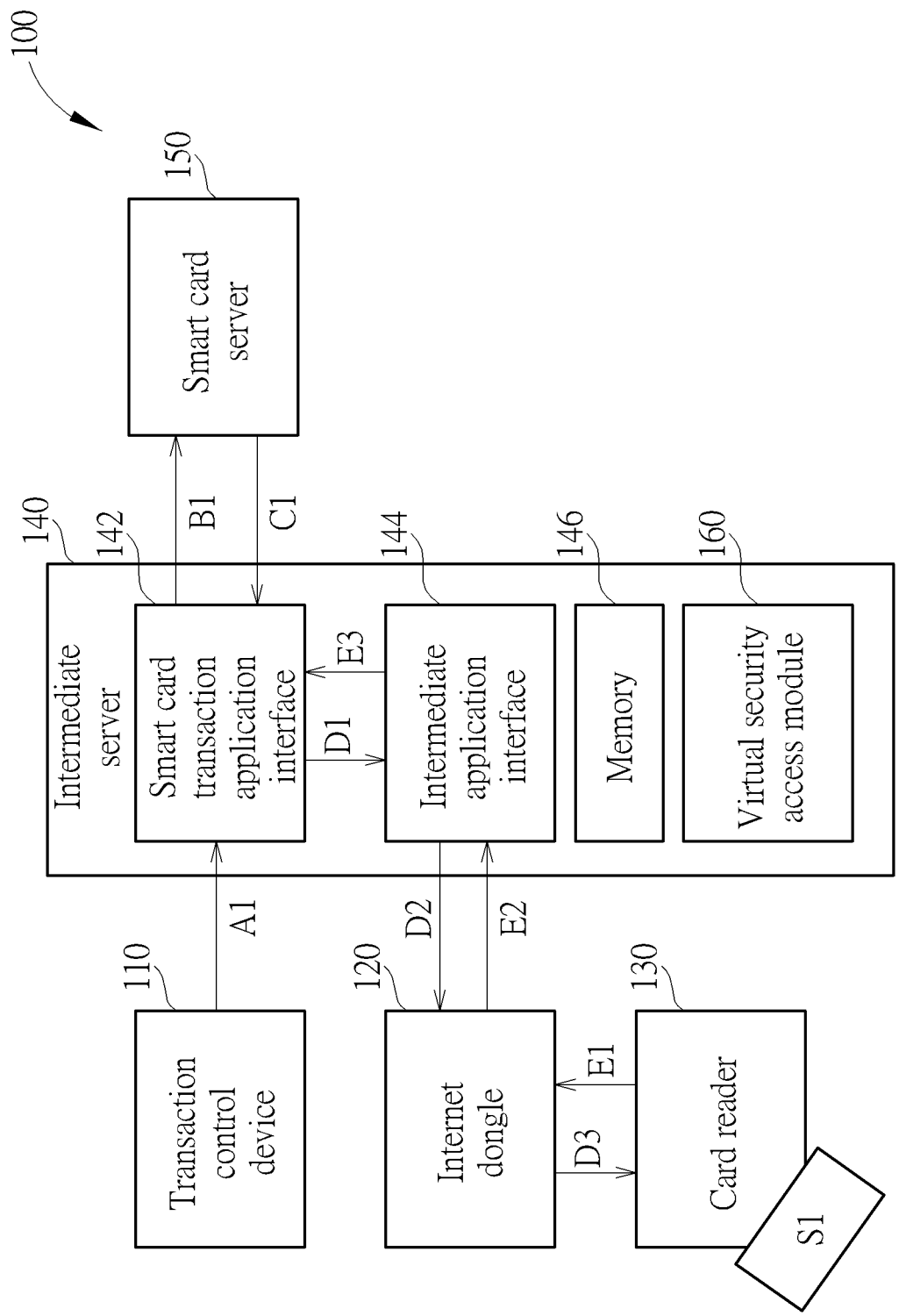
FIG. 1 shows a card reading transaction system according to one embodiment of the present invention.

FIG. 1 shows a card reading transaction system 100 according to one embodiment of the present invention. The card reading transaction system 100 includes a transaction control device 110, an internet dongle 120, a card reader 130, an intermediate server 140, and a smart card server 150.

The transaction control device 110 can be a smart phone, a tablet, or a point of sale (POS) system. The user can assign a transaction type and a transaction amount through the transaction control device 110, and the transaction control device 110 can transmit a first transaction message A1 according to the transaction type and the transaction amount assigned by the user.

The intermediate server 140 includes a smart card transaction application interface 142 and an intermediate application interface 144. The smart card transaction application interface 142 can generate a transaction request message B1 according to the first transaction message A1 to the smart card server 150. In some embodiments, the transaction control device 110 can make a registration on the intermediate server 140 in advance, and transmit the first transaction message A1 with the format and the interface compatible with the intermediate server 140. For example, the transaction control device 110 can connect to the intermediate server 140 by opening a page of a corresponding transaction application, and can access to the intermediate server 140 with the account and password registered previously to ensure the security and authenticity of the transaction message. In some embodiments, the intermediate server 140 can include some other security mechanisms to block the noises and attacks on the internet. For example, the intermediate server 140 can set up a demilitarized zone (DMZ), and can use the error detection code (EDC) and the error correction code (ECC) to ensure the safety and the stability of communications in the internet.

The smart card server 150 is a server for providing the financial service of smart cards. After the transaction request is verified, the smart card server 150 can generate a transaction confirmation message C1 to the intermediate server 140 according to the transaction request message B1. That is, in the prior art, the store owner has to apply to the financial service provider to obtain the specific connecting device before connecting to the smart card server 150 to confirm the transaction. However, with the card reading transaction system 100, the merchant needs only to make registration on the intermediate server 140 online, and the store owner will be able to connect to the smart card server 150 through the smart card transaction application interface 142 of the intermediate server 140 to make the transaction without installing additional hardware.

When the smart card transaction application interface 142 receives the transaction confirmation message C1, the smart card transaction application interface 142 can generate a first card reader operation message D1 according to the transaction confirmation message C1 so the card reader 130 can perform the debit transaction or the credit transaction. In some embodiments, since the smart card transaction application interface 142 has to be compatible with the smart card server 150, the formats of the input information and output information have to meet the predetermined rules. To transmit the operation message of the card reader 130 through the internet, the intermediate application interface 144 can convert the transmission format of the first card reader operation message D1 to generate a second card reader operation message D2, and transmit the second card reader operation message D2 through the internet.

The internet dongle 120 can receive the second card reader operation message D2 through the internet and convert the transmission format of the second card reader operation message D2 to generate a third card reader operation message D3, so the card reader 130 can perform a debit transaction or a credit transaction with a smart card S1 within an effective scope of the card reader 130 according to the third card reader operation message D3. In some embodiments, the smart card S1 can include an electronic tag and corresponding circuits so the card reader 130 can perform read operations and write operations to the smart card S1 without making a contact, for example with the near field communication (NFC).

That is, the internet dongle 120 can be a Wi-Fi dongle applied in an internet of thing (IoT) system that allows an electronic device to connect to the internet. Consequently, with the internet dongle 120, the intermediate server 140 can control the card reader 130 remotely. In some embodiments, the communications between the card reader 130 and the internet dongle 120 can be achieved by the Recommended Standard 232 (RS232) proposed by the Electronic Industry Association. In this case, the internet dongle 120 may have to convert the second card reader operation message D2 with a network package format to the third card reader operation message D3 complying with the RS232.

After the debit transaction or the credit transaction is performed, the card reader 130 can transmit a first operation confirmation message E1. After the internet dongle 120 receives the first operation confirmation message E1, the internet dongle 120 can convert the transmission format of the first operation confirmation message E1 to generate a second operation confirmation message E2. After the intermediate application interface 144 receives the second operation confirmation message E1, the intermediate application interface 144 can convert the transmission format of the second operation confirmation message E2 to generate the third operation confirmation message E3 so as to allow the smart card transaction application interface 142 to analyze the third operation confirmation message and to confirm that the transaction has been completed.

In some embodiments, the intermediate server 140 can further include a memory 146. The intermediate server 140 can store transaction records in the memory 146 for inquiries in the future. For example, the intermediate server 140 can store the transaction type and the transaction amount corresponding to the first transaction message A1 in the memory 146 in extensible markup language (XML). In addition, after the intermediate server 140 confirms that the transaction has been completed, the intermediate server 140 can further transmit the transaction result and details to the transaction control device 110 for the user to confirm.

Furthermore, to ensure the security of the transaction process, the intermediate server 140 and the internet dongle 120 can encrypt and decrypt the transmission message with one or a combination of the transport layer security (TLS) protocol, the secure sockets layer (SSL) protocol, the advanced encryption standard (AES) algorithm, and the Rivest-Shamir-Adleman (RSA) encryption algorithm to ensure transmission security through the internet in some embodiments. For example, in the aforementioned embodiments, the first transaction message A1, the second card reader operation message D2, and the second operation confirmation message E2 can be encrypted by the aforementioned protocols and algorithms.

For example, the internet dongle 120 can be registered in the intermediate server 140 in advance, and the internet dongle 120 can be connected to the intermediate server 140 when booting up and obtain the corresponding encryption key after verification to make the network transmission more secure.

In addition, in some embodiments, the card reader 130 can have the physical security access module (SAM) provided by the smart card server 150 to ensure the card reader 130 to pass the verification and perform operations to the smart cards. However, in some other embodiments, the card reading transaction system 100 can also include a virtual security access module 160 to replace the physical security access module. The virtual security access module 160 can retrieve a time-limited key from the smart card server 150, where the time-limited key is required by the card reader 130 to perform operations to the smart cards. In FIG. 1, the virtual security access module 160 can be disposed in the intermediate server 140. However in some other embodiments, the virtual security access module 160 can also be disposed in other devices, such as the internet dongle 120 or the transaction control device 110. Consequently, the merchant only needs the general card reader 130 to provide the smart card transaction service, and does not need to apply for the hardware device and the physical security access module to the financial industry individually, thereby greatly improving the usage flexibility.

Figure 2:
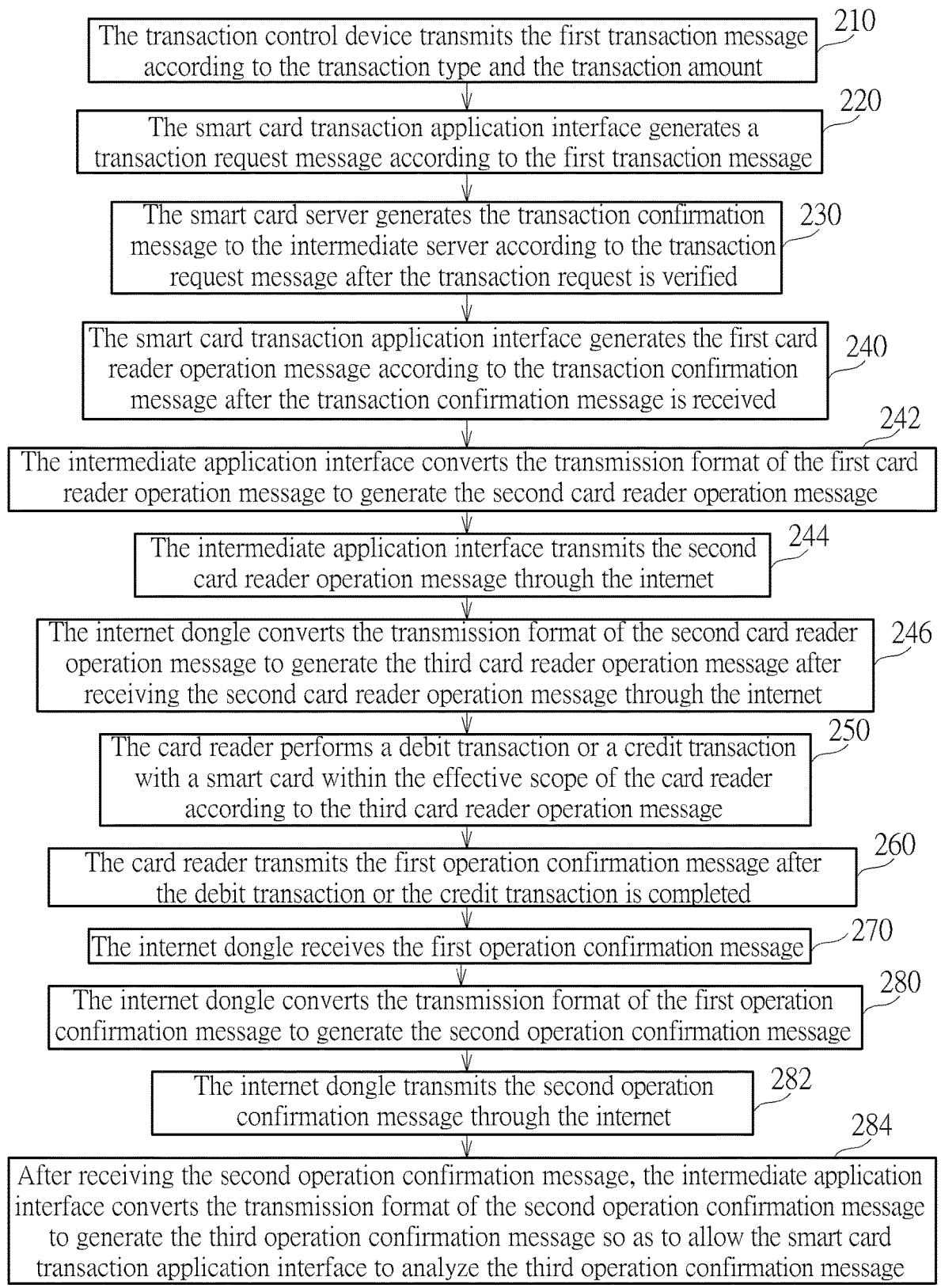
FIG. 2 shows the flowchart of a method for operating the card reading transaction system in FIG. 1 according to one embodiment of the present invention.

FIG. 2 shows the flowchart of a method 200 for operating the card reading transaction system 100 according to one embodiment of the present invention. The method 200 includes steps S210 to S284.

S210: the transaction control device 110 transmits the first transaction message A1 according to the transaction type and the transaction amount;

S220: the smart card transaction application interface 142 generates a transaction request message B1 according to the first transaction message A1;

S230: the smart card server 150 generates the transaction confirmation message C1 to the intermediate server 140 according to the transaction request message B1 after the transaction request is verified;

S240: the smart card transaction application interface 142 generates the first card reader operation message D1 according to the transaction confirmation message C1 after the transaction confirmation message C1 is received;

S242: the intermediate application interface 144 converts the transmission format of the first card reader operation message D1 to generate the second card reader operation message D2;

S244: the intermediate application interface 144 transmits the second card reader operation message D2 through the internet;

S246: the internet dongle 120 converts the transmission format of the second card reader operation message D2 to generate the third card reader operation message D3 after receiving the second card reader operation message D2 through the internet;

S250: the card reader 130 performs a debit transaction or a credit transaction with a smart card S1 within the effective scope of the card reader 130 according to the third card reader operation message D3;

S260: the card reader 130 transmits the first operation confirmation message E1 after the debit transaction or the credit transaction is completed;

S270: the internet dongle 120 receives the first operation confirmation message E1;

S280: the internet dongle 120 converts the transmission format of the first operation confirmation message E1 to generate the second operation confirmation message E2;

S282: the internet dongle 120 transmits the second operation confirmation message E2 through the internet;

S284: after receiving the second operation confirmation message E2, the intermediate application interface 144 converts the transmission format of the second operation confirmation message E2 to generate the third operation confirmation message E3 so as to allow the smart card transaction application interface 142 to analyze the third operation confirmation message E3.

In some embodiments, the intermediate server 140 can further include the memory 146, and the method 200 can further include storing the transaction type and the transaction amount corresponding to the first transaction message A1 in the memory 146 for future inquiries.

In addition, to improve the safety of internet transmission, in some embodiments, the method 200 can further include encrypting the first transaction message A1 and the second card reader operation message D2 by one or a combination of a transport layer security protocol, a secure sockets layer protocol, an advanced encryption standard algorithm, and a Rivest-Shamir-Adleman encryption algorithm. That is, the card reading transaction system 100 can use one or more encryption methods to encrypt the data transmitted by the network according to actual needs to ensure the security and stability of the transaction process. In some embodiments, the intermediate server 140 can update the encryption key every time after the transaction is completed so the network transmission between the intermediate server 140 and the internet dongle 120 can be secured.

Furthermore, the method 200 can further include the virtual security access module 160 registering with the smart card server 150 to obtain the time-limited key required to operate the card reader 130. That is, the card reading transaction system 100 can retrieve the time-limited key with the virtual security access module 160, so the car reader 130 can use the key to perform operations to the smart card S1 before the key is expired. Consequently, the security of the transaction can be maintained, and the hardware equipment needed by the users can be simplified, thereby improving the usage flexibility.

In summary, the card reading transaction systems and the methods for operating the card reading transaction systems provided by the embodiments of the present invention can connect the card reader with the intermediate server through the internet dongle, and connect to the smart card server for providing the financial services through the intermediate server. Therefore, by completing the registration on the intermediate server, the user will be able to provide the transaction services of smart cards without applying or setting up the specific hardware device compatible with the smart card server, thereby greatly improving the flexibility in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A card reading transaction system comprising:
  a transaction control device configured to transmit a first transaction message according to a transaction type and a transaction amount;
  an intermediate server comprising:
    a smart card transaction application interface configured to generate a transaction request message according to the first transaction message; and
    an intermediate application interface;
  a smart card server configured to generate a transaction confirmation message to the intermediate server according to the transaction request message after the transaction request is verified, wherein:
    the smart card transaction application interface is further configured to generate a first card reader operation message according to the transaction confirmation message after the transaction confirmation message is received; and the intermediate application interface is configured to convert a transmission format of the first card reader operation message to generate a second card reader operation message, and transmit the second card reader operation message through an internet;

an internet dongle configured to receive the second card reader operation message through the internet and convert a transmission format of the second card reader operation message to generate a third card reader operation message; and a card reader configured to perform a debit transaction or a credit transaction with a smart card within an effective scope of the card reader according to the third card reader operation message.

2. The card reading transaction system of claim 1, wherein the transaction control device is a smart phone, a tablet, or a point of sale (POS) system.

3. The card reading transaction system of claim 1, wherein the intermediate server further comprises a memory configured to store the transaction type and the transaction amount corresponding to the first transaction message.

4. The card reading transaction system of claim 1, wherein:
the card reader is further configured to transmit a first operation confirmation message after the debit transaction or the credit transaction is completed;
the internet dongle is further configured to receive the first operation confirmation message, convert a transmission format of the first operation confirmation message to generate a second operation confirmation message, and transmit the second operation confirmation message through the internet; and
the intermediate application interface is further configured to receive the second operation confirmation message, and convert a transmission format of the second operation confirmation message to generate a third operation confirmation message so as to allow the smart card transaction application interface to analyze the third operation confirmation message.

5. The card reading transaction system of claim 1, wherein the first transaction message and the second card reader operation message are encrypted by one or a combination of a transport layer security (TLS) protocol, a secure sockets layer (SSL) protocol, an advanced encryption standard (AES) algorithm, and an Rivest-Shamir-Adleman (RSA) encryption algorithm to ensure transmission security through the internet.

6. The card reading transaction system of claim 1, further comprising a virtual security access module (SAM) configured to retrieve a time-limited key from the smart card server, wherein the time-limited key is required for operating the card reader.

7. The card reading transaction system of claim 6, wherein the virtual security access module system is disposed in the intermediate server, the internet dongle or the transaction control device.

8. A method for operating a card reading transaction system, the card reading transaction system comprising a transaction control device, an intermediate server, a smart card server, an internet dongle, and a card reader, the intermediate server comprising an intermediate application interface and a smart card transaction application interface, and the method comprising:
the transaction control device transmitting a first transaction message according to a transaction type and a transaction amount;

the smart card transaction application interface generating a transaction request message according to the first transaction message;
the smart card server generating a transaction confirmation message to the intermediate server according to the transaction request message after the transaction request is verified;
the smart card transaction application interface generating a first card reader operation message according to the transaction confirmation message after the transaction confirmation message is received;
the intermediate application interface converting a transmission format of the first card reader operation message to generate a second card reader operation message;
the intermediate application interface transmitting the second card reader operation message through an internet;
the internet dongle converting a transmission format of the second card reader operation message to generate a third card reader operation message after receiving the second card reader operation message through the internet; and
the card reader performing a debit transaction or a credit transaction with a smart card within an effective scope of the card reader according to the third card reader operation message.

9. The method of claim 8, wherein the intermediate server further comprises a memory, and the method further comprises the intermediate server storing the transaction type and the transaction amount corresponding to the first transaction message in the memory.

10. The method of claim 8, further comprising:
the card reader transmitting a first operation confirmation message after the debit transaction or the credit transaction is completed;
the internet dongle converting a transmission format of the first operation confirmation message to generate a second operation confirmation message after receiving the first operation confirmation message;
the internet dongle transmitting the second operation confirmation message through the internet; and
the intermediate application interface converting a transmission format of the second operation confirmation message to generate a third operation confirmation message so as to allow the smart card transaction application interface to analyze the third operation confirmation message after receiving the second operation confirmation message.

11. The method of claim 8, further comprising:
encrypting the first transaction message by one or a combination of a transport layer security (TLS) protocol, a secure sockets layer (SSL) protocol, an advanced encryption standard (AES) algorithm, and a Rivest-Shamir-Adleman (RSA) encryption algorithm; and
encrypting the second card reader operation message by one or a combination of the TLS protocol, the SSL protocol, the AES algorithm, and the RSA encryption algorithm.

12. The method of claim 8, wherein the card reading transaction system further comprises a virtual security access module (SAM), and the method further comprises the virtual security access module retrieving a time-limited key from the smart card server, wherein the time-limited key is required for operating the card reader.

\* \* \* \* \*